United States Patent
Wu et al.

(10) Patent No.: US 6,941,072 B2
(45) Date of Patent: Sep. 6, 2005

(54) COMPACT OPTICAL MULTIPLEXER/DEMULTIPLEXER

(75) Inventors: Li Wu, Fuxing Investment District (CN); Zhanhua Guo, Shanghai (CN); Jiwu Ling, Fuxing Investment District (CN); Heping Zeng, Shanghai (CN); Zhizhan Ruan, Fuxing Investment District (CN); Jiayong Ma, Fuxing Investment District (CN)

(73) Assignee: JDS Uniphase Corporation, San Jose, CA (US)

( * ) Notice: Subject to any disclaimer, the term of this patent is extended or adjusted under 35 U.S.C. 154(b) by 708 days.

(21) Appl. No.: 09/981,048

(22) Filed: Oct. 16, 2001

(65) Prior Publication Data

US 2002/0057868 A1 May 16, 2002

(30) Foreign Application Priority Data

Oct. 17, 2000 (CN) .......................... 00240681 U
Jun. 18, 2001 (CN) .......................... 01244422 U

(51) Int. Cl.$^7$ ............................................... H04J 14/02
(52) U.S. Cl. .............................. 398/83; 398/85; 398/86
(58) Field of Search ........................... 398/43, 48, 83, 398/85, 86, 96; 385/24

(56) References Cited

U.S. PATENT DOCUMENTS

| | | | | |
|---|---|---|---|---|
| 4,244,045 A | * | 1/1981 | Nosu et al. | 398/86 |
| 4,343,532 A | * | 8/1982 | Palmer | 385/36 |
| 5,724,165 A | * | 3/1998 | Wu | 398/55 |
| 5,808,763 A | * | 9/1998 | Duck et al. | 398/79 |
| 6,008,920 A | * | 12/1999 | Hendrix | 398/79 |
| 6,078,710 A | * | 6/2000 | Li et al. | 385/39 |
| 6,567,578 B1 | * | 5/2003 | Zhang et al. | 385/24 |

* cited by examiner

*Primary Examiner*—M. R. Sedighian
*Assistant Examiner*—Dzung Tran
(74) *Attorney, Agent, or Firm*—Allen, Dyer, Doppelt, Milbrath & Gilchrist, P.A.

(57) ABSTRACT

The invention relates to wavelength division multiplexing (WDM) and demultiplexing of optical signals using optical filters in free space. To minimize dispersion, the present invention uses relatively small angles of incidence. To avoid the need for a large package, the present invention utilizes reflective prisms to steer the reflected beams to provide a lateral shift in the beam path that ensures that the necessary space is provided between the input/output ports. Devices including a single adjustable filter are disclosed, along with devices having a plurality of filters.

15 Claims, 8 Drawing Sheets

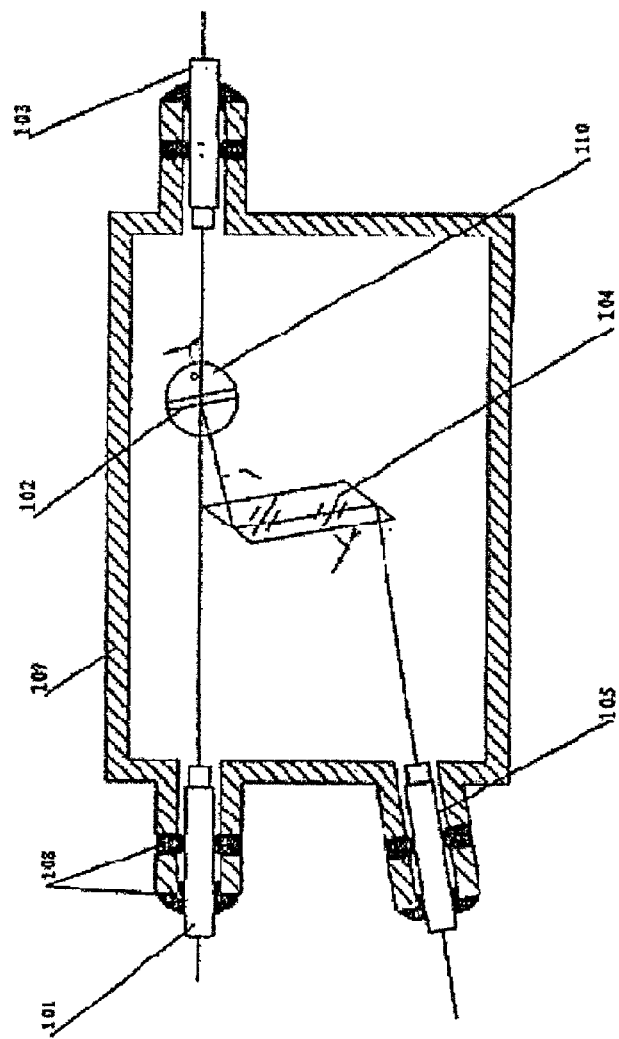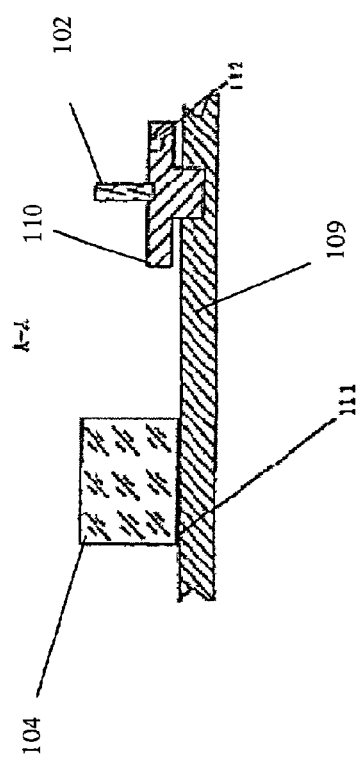
Figure 5a
Figure 5b

COMPACT OPTICAL MULTIPLEXER/DEMULTIPLEXER

TECHNICAL FIELD

The present application relates to a wavelength division multiplexer/demultiplexer, and in particular to a compact wavelength division multiplexer/demultiplexer utilizing optical filters in free space.

BACKGROUND OF THE INVENTION

Conventional wavelength division multiplexing (WDM) couplers, such as the one disclosed in FIG. 1, include a double bore ferrule 21 encasing the ends of optical fibers 11 and 12, which are optically coupled to a lens 31. The lens 31 collimates a beam of light from the fiber 11 onto an optical filter 41, which passes light centered around a single wavelength. This wavelength corresponds to one or more channels. The remainder of the light is reflected back through the lens 31 and out the fiber 12. The light that is passed through the filter 41 is focused by a lens 32 onto a fiber 13, which is encased in a ferrule 22. Alternatively, when used as a multiplexer, light from the fiber 12 is reflected by the filter 41 and combined with light passing therethrough from fiber 13. The combined signal is output the fiber 11.

There are certain drawbacks to these conventional couplers, such as a certain amount of cross talk between the fibers 11 and 12 due to their close proximity. The center wavelength ($\lambda_p$) passed by the optical filter 41 is dependent upon the angle of incidence of the light hitting the filter, i.e. $\lambda_p = \lambda_0 (1 - c \cdot \sin^2 \theta)^{1/2}$ in which c is a constant dependent upon the particular filter. However, due to the fact that the position of filter 41 is fixed, the center wavelength of the passband of the filter cannot easily be tuned. As a result, selecting the appropriate filter for the desired passband before manufacturing the coupler becomes critical.

One type of optical device provided as a solution for overcoming these shortcomings is disclosed in U.S. Pat. No. 4,244,045 issued Jan. 6, 1981 to Nippon Telegraph and Telephone. During the manufacture of these devices, each optical filter can be individually angle tuned to maximize optical coupling. However, as is well known in the art, the bandwidth of the passband decreases as the angle of incidence increases, resulting in an increase in the insertion loss of the filter. Furthermore, polarization dependent loss (PDL), i.e. the difference in the transmission of the S and P components of the signal, greatly increases with an increase in the angle of incidence.

Accordingly, what is required is a device that enables the filters to be angle tuned, while minimizing the angle at which the light is incident on the filter. However, this raises another problem related to the physical restraints of positioning two ports, each with their own lens and ferrule, beside each other. With reference to FIG. 2, we will assume that for a beam of diameter $\Phi=0.46$ mm the distance D between the ports must be at least 6.5 mm. If we also assume that the angle of incidence between the beam of light and the filter normal must be 1.8° or less, we can calculate the distances $L_1$ and $L_2$ to be approximately 100 mm each for a total beam path $L_1+L_2$ of 200 mm. This is a great distance for the beams to travel, which would require an unnecessarily large package to support. FIG. 3 schematically represents a multi-filter WDM platform that would be required assuming the aforementioned calculations. This device includes a plurality of filters 41, between which a WDM signal bounces while dropping channels at the ports.

An object of the present invention is to overcome the shortcomings of the prior art by providing a compact wavelength divisional multiplexer with tunable optical filters and without requiring relatively large angles of incidence.

SUMMARY OF THE INVENTION

Accordingly, the present invention relates to an optical multiplexer/demultiplexer device comprising:

a first input/output port through which a wavelength division multiplexed (WDM) signal comprising a plurality of wavelength channels is input or output along an first path in free space;

a first optical filter disposed in the first path for transmitting at least a first predetermined wavelength channel of the WDM signal along the first path, and for reflecting other wavelength channels of the WDM signal at a reflection angle between the first path and a second path in free space;

a first add/drop port for outputting or inputting the first predetermined wavelength channel;

a second input/output port adjacent to the first input/output port for outputting or inputting the other wavelength channels of the WDM signal traveling along a third path in free space; and a first prism for redirecting the other wavelength channels of the WDM signal traveling between the second path and the third path, whereby the position of the second input/output port is independent of the reflection angle and the required distance between the first drop port and the second input/output port is reduced.

Another aspect of the present invention relates to an optical demultiplexer device comprising:

a first input/output port through which a wavelength division multiplexed (WDM) signal comprising a plurality of wavelength channels is input along an first path in free space;

a first optical filter disposed in the first path for transmitting at least a first predetermined wavelength channel of the WDM signal, and for reflecting a first sub-signal of the WDM signal along a second path in free space at an angle to the first path;

a first drop port for outputting at least the first predetermined wavelength channel transmitted by the first optical filter;

a first prism for redirecting the first sub-signal of the WDM signal traveling along the second path to a third path;

a second optical filter disposed in the third path for transmitting at least a second predetermined channel of the WDM signal, and for reflecting a second sub-signal of the WDM signal along a fourth path in free space at an angle to the third path; and a second drop port adjacent to the first input/output port for outputting at least the second predetermined channel transmitted by the first optical filter;

whereby the position of the second drop port is independent of the angle between the second and third paths, and the required distance between the first drop port and the second drop port is reduced.

Another feature of the present invention provides an optical demultiplexer device comprising:

a housing for supporting a plurality of ports at the periphery, and defining a free space therein;

an input port through which a wavelength division multiplexed (WDM) signal comprising a plurality of wavelength channels is input into the free space;

a plurality of optical filters sequentially disposed in the path of said WDM signal, each filter for transmitting at least one predetermined channel of the WDM signal, and for reflecting the remainder of the WDM signal at an angle of reflection to be incident upon the next optical filter;

a plurality of drop ports, one drop port corresponding to each optical filter, for outputting the predetermined channels transmitted by the corresponding optical filter; and a plurality of prisms for redirecting the WDM signal traveling between the plurality of optical filters, whereby the position of each drop port is dependent upon the prisms and independent of the angles of reflection.

BRIEF DESCRIPTION OF THE DRAWINGS

The invention will be described in greater detail with reference to the accompanying drawings which represent preferred embodiments thereof, wherein:

FIGS. 5a and 5b are a cross-sectional views of a WDM filter device according to the present invention;

DETAILED DESCRIPTION

Figure 1:
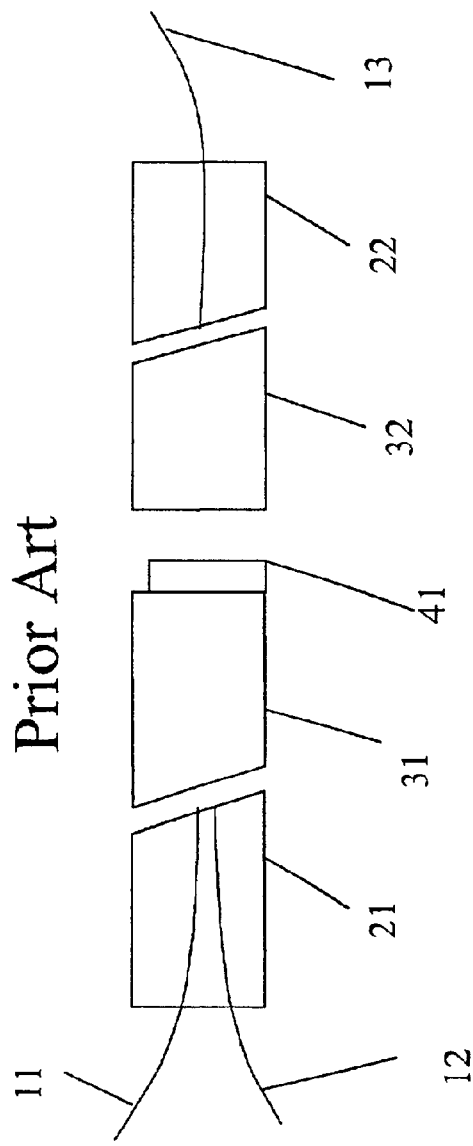
FIG. 1 is an exploded schematic view of a conventional WDM coupler.
Figure 2:
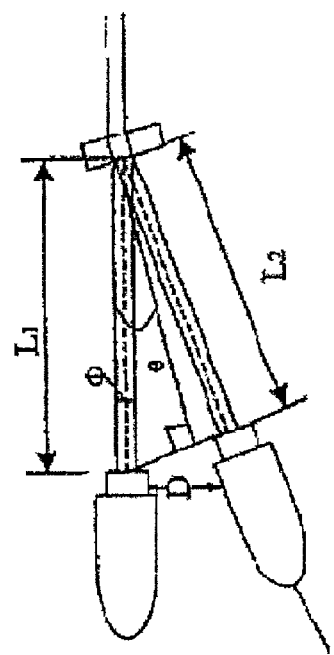
FIG. 2 is a schematic illustration of a conventional WDM filter arrangement in free space.
Figure 3:
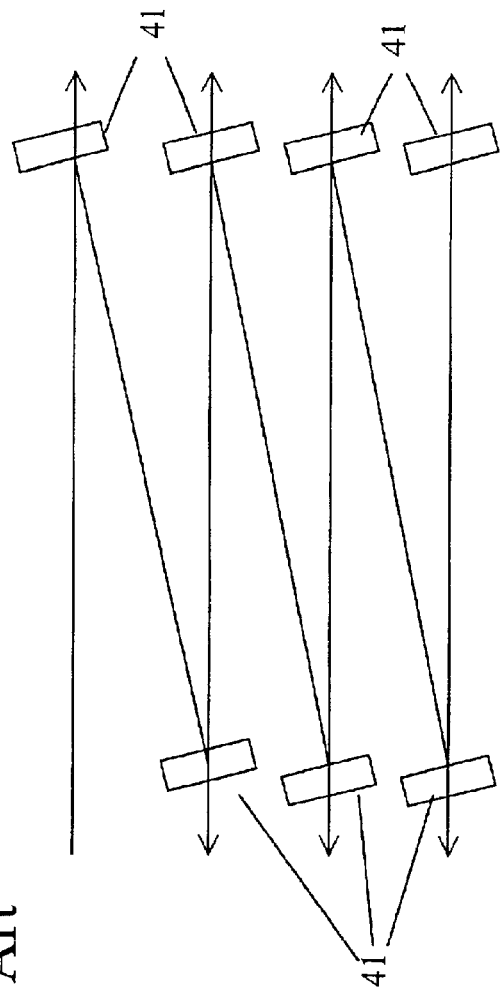
FIG. 3 is a schematic illustration of a conventional WDM multi-filter platform arrangement in free space.
Figure 4:
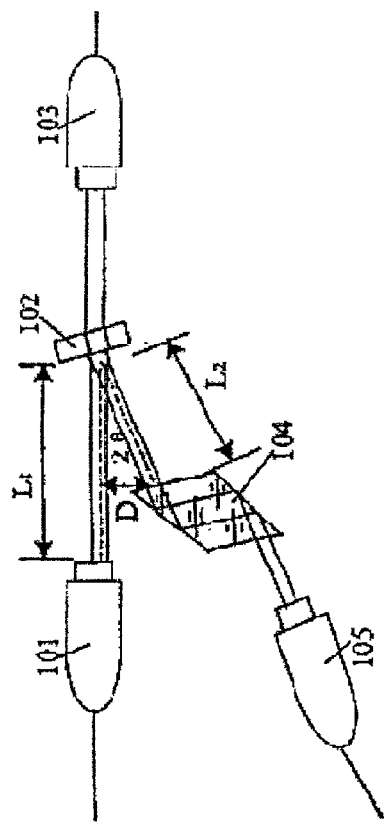
FIG. 4 is a schematic illustration of a WDM filter arrangement according to the present invention.

In contrast to FIG. 2, the WDM filter arrangement according to an embodiment of the present invention is illustrated in FIG. 4 and includes an input/output port 101, an optical filter 102, an add/drop port 103, a prism 104, and an output/input port 105. The ports 101, 103 and 105 include a single bore ferrule encasing an end of an optical fiber, which is optically coupled to a lens. The lens is typically a ¼ pitch graded index (GRIN) lens, such as those available under the trademark SELFOC® from NSG Co. Ltd. of Osaka, Japan.

The addition of the prism 104 enables the beam to be reflected at a relatively small angle of reflection, e.g. $\theta_i = \theta_r = 1.8°$, without being a factor in the positioning of the output/input port 105. In the illustrated embodiment, the opposite faces of the prism 104 are parallel, which ensures that the beam exits the prism 104 along a path parallel to the path along which the beam entered the prism 104. The opposite faces of the prism 104 can be arranged at an angle causing total internal reflection of the beam or coated with a reflective coating. Using the aforementioned assumptions, the total beam path $L_1 + L_2$ can be cut down to approximately 20 to 30 mm.

FIGS. 5a and 5b illustrate the elements of FIG. 4 mounted in a housing 109. The ports 101, 103 and 105 are attached to the housing 109 using either an adhesive or a weld 108.

The optical filter 102 is mounted on a rotatable base 110, which enables the optical filter 102 to be angle tuned prior to attachment. A recess 112 is provided on the base 110 to facilitate rotation thereof using a separate implement (not shown). The prism 104 is also independent of the other elements, and is therefore also adjustable prior to permanent assembly to allow for tuning. An adhesive layer 111 is provided to fix the prism 104 to the housing 109.

Figure 6:
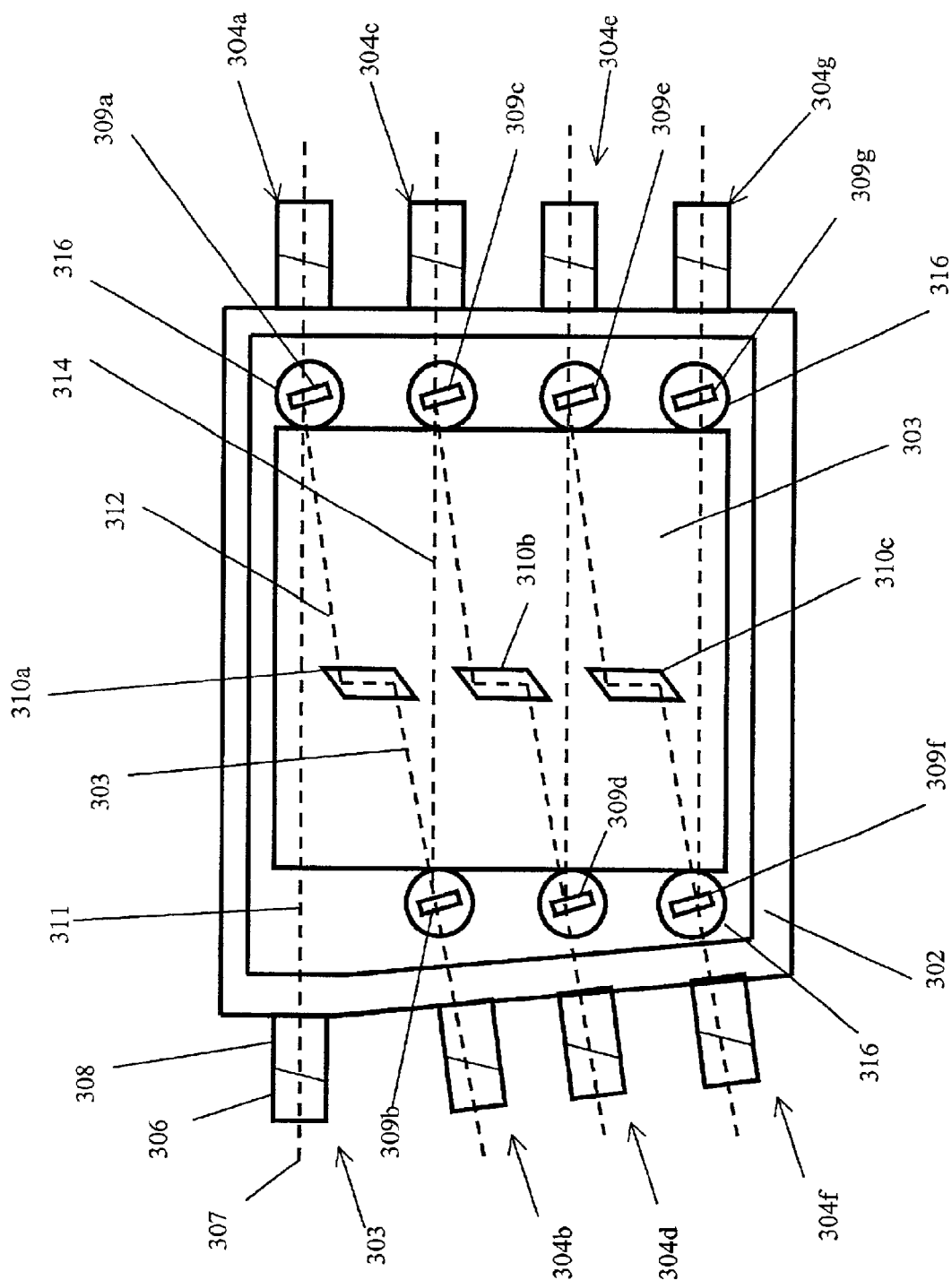
FIG. 6 is a cross-sectional view of a WDM multi-filter platform device according to the present invention.

The multi-filter version of the present invention is illustrated in FIG. 6, and includes a housing 301 defining a free space 302. An input/output port 303, along with a plurality of add/drop ports 304a to 304g, are mounted on the sides of the housing 301. Each port includes a ferrule 306 surrounding an end of an optical fiber 307, which is optically coupled to a lens 308. Each add/drop port 304a to 304g has a corresponding optical filter 309a to 309g, each one adapted to pass a different passband, i.e. channel or channels, at substantially the same angle of incidence. Prisms 310a to 310c are disposed in the path of the signal traveling from one filter to the next.

When demultiplexing, a WDM signal with a plurality of channels ($\lambda_1$ to $\lambda_n$) is launched via the input/output port along a first path 311. The first optical filter 309a passes a first channel $\lambda_1$ to the first add/drop port 304a. The remainder of the WDM signal is reflected at a relatively small angle towards the other side of the housing 301 containing the next add/drop port 304b along a second path 312. In order to minimize the footprint of the device, the prism 310a redirects the remainder of the WDM signal from the second path 312 to a third path 313. The lateral shift in the beam path provides the space necessary to be able to mount the second add/drop port 304b adjacent thereto, while keeping the desired angle of incidence. The second optical filter 309b passes a second channel $\lambda_2$ to the second add/drop port 304b, and reflects the remaining signal towards the next optical filter 309c along a fourth path 314. The WDM signal continues to zig-zag through the housing 301 dropping the appropriate channel or channels at the desired add/drop ports. What is left of the signal can be captured in the final add/drop port 304g or simply reflected off the final optical filter 309g and lost. To facilitate reproduction, the second path 312 is substantially parallel to the third path 313, while the first path 311 is substantially parallel to the fourth path 314. A rotatable mount 316 is provided for each filter 309 to facilitate the tuning of the optical filters during assembly.

Figure 8:
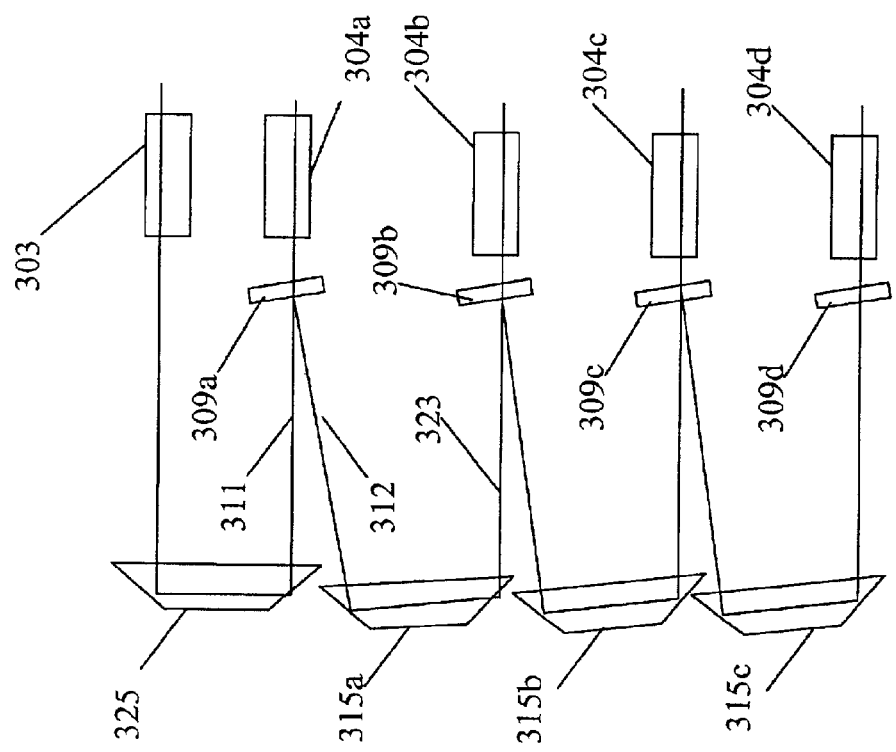
FIG. 8 is a schematic illustration of a third embodiment of a WDM multi-filter platform device according to the present invention.
Figure 7:
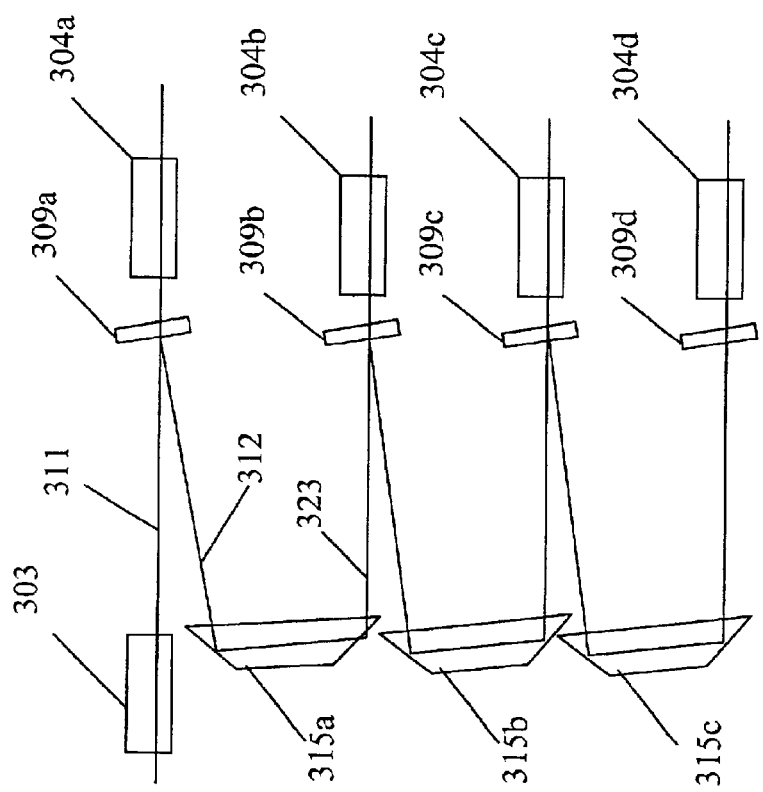
FIG. 7 is a schematic illustration of a second embodiment of a WDM multi-filter platform device according to the present invention.

Alternative layouts for the multi-filter assembly are illustrated in FIGS. 7 and 8. With reference to FIG. 7, the input/output port 303 is positioned on one side of the housing, while all of the add/drop ports 304a to 304d are positioned on the opposite side. In this embodiment, the prisms 315a to 315b redirect WDM signals from the second path 312 to a third path 323, which is substantially parallel to the first path 311. If all of the ports are required to be on one side, as in FIG. 8, an additional prism 325 is used to redirect the initial WDM signal back along the first path 311.

The above discussion is directed towards using the device as a demultiplexer; however, it would be obvious to one skilled in the art to use the device of the present invention as a multiplexer or a demultiplexer.

Figure 9:
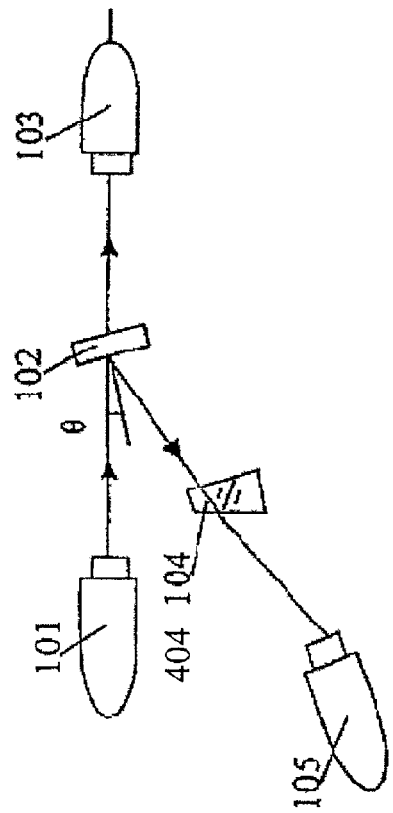
FIGS. 9 to 14 are schematic illustrations of other embodiments of WDM filter devices according to the present invention.
Figure 10:
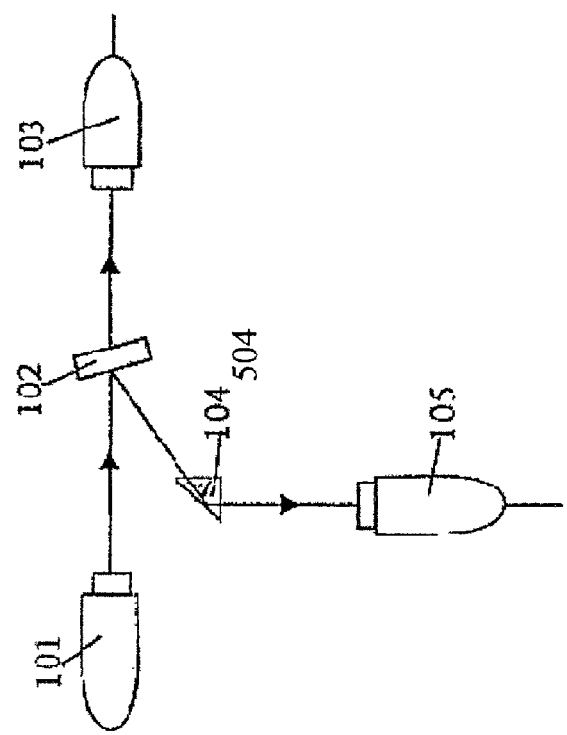
Figure 11:
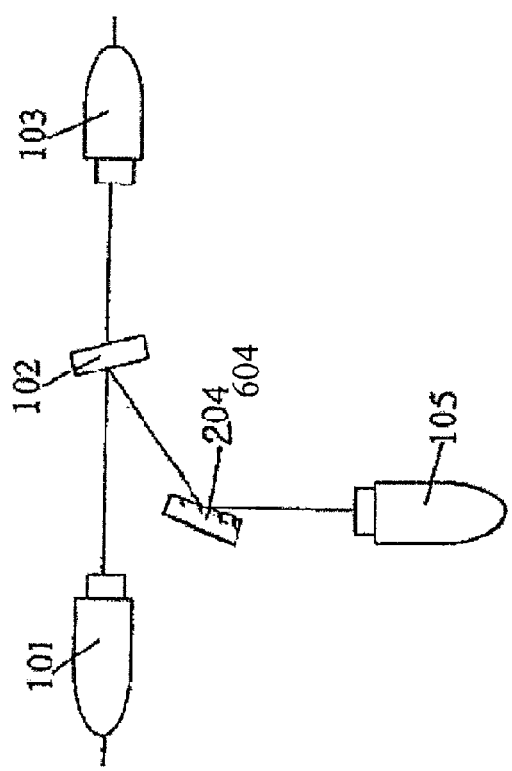

FIGS. 9 to 14 illustrate additional embodiments of the WDM filter arrangement including a variety of different kinds of prisms. In FIG. 9, the prism 404 has opposite sides cut with two different angles, thereby causing the beam to exit the prism 404 along a path that is not parallel to the entry path. Total internal reflection on one face of prism 504 is used in the device illustrated in FIG. 10 to redirect the beam towards the port 105. Alternatively, the device in FIG. 11 uses a reflective surface 604 to redirect the beam to the port 105.

Figure 12:
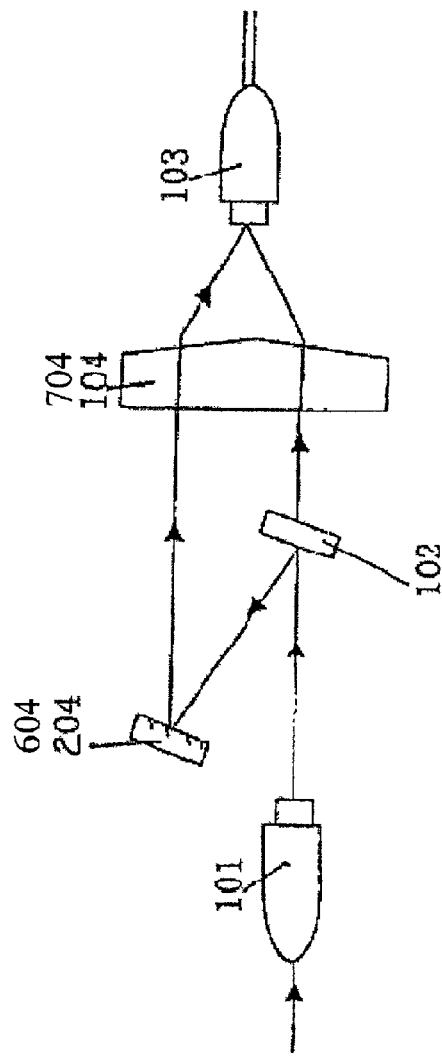
Figure 13:
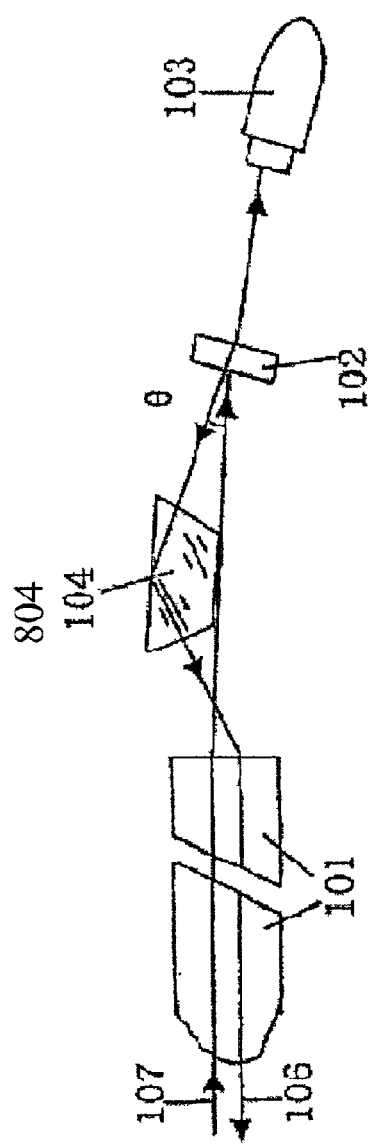
Figure 14:
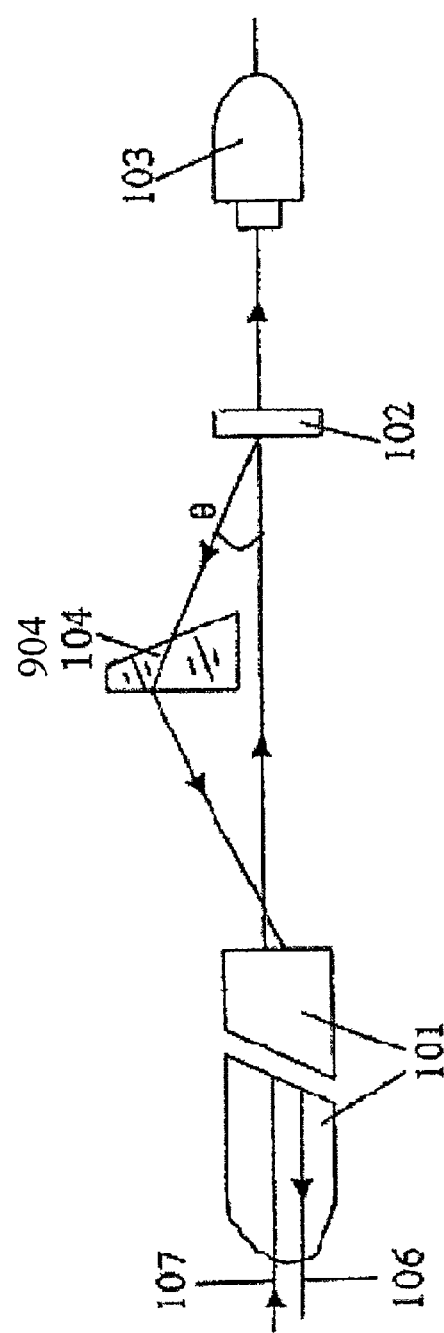

In FIG. 12, the reflective surface 604 is used in combination with a prism 704 to direct the reflected beam to one of the fibers of a double bore tube. The other fiber is used to transmit the light passed by the filter 102. In FIGS. 13 and 14 prism 804 and 904, respectively, are used to direct the reflected beam back to a double bore tube 101, which inputs the initial WDM signal via fiber 107 and outputs the reflected signal via fiber 106.

We claim:

1. An optical demultiplexer device comprising:
    a first input/output port through which a wavelength division multiplexed (WDM) signal comprising a plurality of wavelength channels is input along a first path in free space;
    a first optical filter disposed in the first path for transmitting at least a first predetermined wavelength channel of the WDM signal, and for reflecting a first sub-signal of the WDM signal along a second path in free space at an angle to the first path;
    a first drop port for outputting at least the first predetermined wavelength channel transmitted by the first optical filter;
    a first prism for redirecting the first sub-signal of the WDM signal traveling along the second path to a third path;
    a second optical filter disposed in the third path for transmitting at least a second predetermined channel of the WDM signal, and for reflecting a second sub-signal of the WDM signal along a fourth path in free space at an angle to the third path; and
    a second drop port adjacent to the first input/output port for outputting at least the second predetermined channel transmitted by the first optical filter;
    whereby the position, of the second drop port is independent of the angle between the second and third paths, and the required distance between the first drop port and the second drop port is reduced.

2. The device according to claim 1, further comprising;
    a third optical filter in the fourth path for transmitting at least a third predetermined channel of the WDM signal, and for reflecting a third sub-signal of the WDM signal along a fifth path in free space at an angle to the fourth path;
    a third drop port adjacent to the first drop port for outputting at least the third predetermined channel transmitted by the third optical filter
    a second prism for redirecting the second sub-signal of the WDM signal traveling along the fifth path to a sixth path;
    a fourth optical filter in the sixth path for transmitting at least a fourth predetermined channel of the WDM signal, and for reflecting a fourth sub-signal of the WDM signal along a seventh path in free space at an angle to the sixth path; and
    a fourth drop port adjacent the second drop port for outputting at least the fourth predetermined channel transmitted by the fourth optical filter.

3. The device according to claim 2, further comprising a second input/output port for outputting any wavelength channels not transmitted by the optical filters.

4. The device according to claim 1, wherein the first prism has one reflective surface for redirecting the first sub-signal.

5. The device according to claim 1, wherein the first prism has two reflective surfaces for redirecting the first sub-signal.

6. The device according to claim 5, wherein the second path is substantially parallel to the third path.

7. The device according to claim 1, for multiplexing a WDM signal; wherein a signal traveling along the fourth path towards the second optical filter is multiplexed thereby with a signal comprising the second predetermined wavelength channel input the second drop port into a first combined signal, wherein the first combined signal is directed along the third path to the second path by the first prism; wherein the first combined signal is multiplexed by the first optical filter with a signal comprising the first predetermined wavelength channel input the first drop port into a second combined signal; and wherein the second combined signal is directed by the first optical filter for output the first input/output port.

8. The device according to claim 1, wherein when the second wavelength channel is input the second drop port and the first wavelength channel is input the first drop port, the first and second wavelength channels are multiplexed together and output the first input/output port.

9. An optical demultiplexer device comprising:
    a housing for supporting a plurality of ports at the periphery, and defining a free space therein;
    an input port through which a wavelength division multiplexed (WDM) signal comprising a plurality of wavelength channels is input into the free space;
    a plurality of optical filters sequentially disposed in the path of said WDM signal, each filter for transmitting at least one predetermined channel of the WDM signal, and for reflecting the remainder of the WDM signal at an angle of reflection to be incident upon the next optical filter;
    a plurality of drop ports, one drop port corresponding to each optical filter, for outputting the predetermined channels transmitted by the corresponding optical filter; and
    a plurality of prisms for redirecting the WDM signal traveling between the plurality of optical filters, whereby the position of each drop port is dependent upon the prisms and independent of the angles of reflection;
    wherein the each prism has two reflective surfaces for redirecting the reflected WDM signals; and
    wherein a first set of the optical filters are mounted on one side of the housing in a linear array and wherein a second set of the optical filters are mounted on another side of the housing in a linear array, opposite to the first set of the optical filters.

10. The device according to claim 9, wherein each prism has one reflective surface for redirecting the reflected WDM signals.

11. The device according to claim 9, further comprising an output port for outputting any wavelength channels not transmitted by the plurality of optical filters.

12. The device according to claim 9, wherein the WDM signal entering each prism along a first path exits each prism along a second path, which is parallel to the first path.

13. The device according to claim 9, wherein the WDM signal enters each prism along a reflected path and exits each prism along an incident path, which is not parallel to the reflected path.

14. The device according to claim 13, wherein all of the drop ports are mounted on one side of the housing in a linear array.

15. The device according to claim 9, for use as a multiplexer.

* * * * *